United States Patent
Cavagne et al.

(10) Patent No.: US 10,807,033 B2
(45) Date of Patent: Oct. 20, 2020

(54) VERTICAL PURIFICATION DEVICE

(71) Applicant: L'Air Liquide, Société Anonyme pour l'Etude et l'Exploitation des Procédés Georges Claude, Paris (FR)

(72) Inventors: Patrice Cavagne, Le Perreux sur Marne (FR); Gabriel Da Silva, Boissy-Saint-Léger (FR); Olivier De Cayeux, Nogent sur Marne (FR); Alain Guillard, Houston, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 247 days.

(21) Appl. No.: 15/768,718

(22) PCT Filed: Oct. 13, 2016

(86) PCT No.: PCT/FR2016/052649
§ 371 (c)(1),
(2) Date: Apr. 16, 2018

(87) PCT Pub. No.: WO2017/064427
PCT Pub. Date: Apr. 20, 2017

(65) Prior Publication Data
US 2018/0296965 A1 Oct. 18, 2018

(30) Foreign Application Priority Data
Oct. 16, 2015 (FR) ..................... 15 59847

(51) Int. Cl.
*B01D 53/04* (2006.01)
*B01D 53/047* (2006.01)

(52) U.S. Cl.
CPC ........ *B01D 53/0407* (2013.01); *B01D 53/047* (2013.01); *B01D 53/0462* (2013.01);
(Continued)

(58) Field of Classification Search
CPC .. B01D 53/04; B01D 53/047; B01D 53/0407; B01D 53/0462; B01D 2256/12;
(Continued)

(56) References Cited

U.S. PATENT DOCUMENTS

| 2,625,237 A * | 1/1953 | Gribler | B01D 53/26 96/126 |
| 2,979,828 A * | 4/1961 | Westeren | B01D 53/26 34/68 |

(Continued)

FOREIGN PATENT DOCUMENTS

| CN | 204 637 913 U | 9/2015 |
| EP | 0 092 153 | 10/1983 |

(Continued)

OTHER PUBLICATIONS

International Search Report for corresponding PCT/FR2016/052649, dated Dec. 9, 2016.

*Primary Examiner* — Frank M Lawrence, Jr.
(74) *Attorney, Agent, or Firm* — Elwood L. Haynes

(57) ABSTRACT

A gas purification device including two adsorbers, each having a lower portion and an upper portion, a gas compressor, a heater, a set of exchangers, a first assembly of pipework and valves, and a second assembly of pipework and valves, wherein the first assembly of pipework and valves is located on the floor or on a metal structure proximate to the lower portion, and the second assembly of pipework and valves is located high up along the same vertical axis as the first assembly of pipework and valves proximate to the upper portion.

19 Claims, 3 Drawing Sheets

(52) U.S. Cl.
CPC ...... *B01D 2256/12* (2013.01); *B01D 2256/20* (2013.01); *B01D 2257/504* (2013.01); *B01D 2257/80* (2013.01); *B01D 2259/402* (2013.01); *Y02C 10/08* (2013.01)

(58) Field of Classification Search
CPC .......... B01D 2256/20; B01D 2257/504; B01D 2257/80; B01D 2259/402; Y02C 10/08
USPC .......................................... 96/108, 121, 126
See application file for complete search history.

(56) References Cited

U.S. PATENT DOCUMENTS

| | | | |
|---|---|---|---|
| 3,164,452 A * | 1/1965 | Westeren | B01D 53/26 95/115 |
| 3,338,030 A | 8/1967 | Feldbauer, Jr. et al. | |
| 4,631,073 A * | 12/1986 | Null | B01D 53/0446 95/1 |
| 4,738,692 A * | 4/1988 | Fresch | B01D 53/047 95/122 |
| 4,802,899 A | 2/1989 | Vrana et al. | |
| 4,983,190 A | 1/1991 | Verrando et al. | |
| 5,137,548 A | 8/1992 | Grenier et al. | |
| 5,223,004 A | 6/1993 | Eteve et al. | |
| 2005/0056149 A1* | 3/2005 | Bayreuther | B01D 53/0446 95/96 |
| 2006/0288869 A1* | 12/2006 | Warren | B01D 53/0407 95/130 |
| 2012/0042781 A1 | 2/2012 | Berthome et al. | |

FOREIGN PATENT DOCUMENTS

| | | |
|---|---|---|
| SU | 1313495 | 5/1987 |
| WO | WO 2010 094844 | 8/2010 |

* cited by examiner

VERTICAL PURIFICATION DEVICE

CROSS REFERENCE TO RELATED APPLICATIONS

This application is a 371 of International PCT Application No. PCT/FR2016/052649, filed Oct. 13, 2016, which claims priority to French Patent Application No. 1559847, filed Oct. 16, 2015, the entire contents of which are incorporated herein by reference.

BACKGROUND

The present invention relates to a device for purifying a gas comprising two adsorbers and a particular arrangement of pipework.

Separation devices of this type are essentially used in pressure swing adsorption (PSA) or temperature swing adsorption (TSA) technologies for the production, from a gaseous mixture, of a gaseous constituent of this mixture, in particular of a constituent of air, oxygen or nitrogen, or for the purification of a gaseous mixture, in particular feed air of a cryogenic air separation unit, also for the production of a constituent of air, oxygen and/or nitrogen and/or argon and generally use at least one of the adsorbents selected from the group comprising zeolites, activated carbon, alumina or silica gels. Examples of these technologies are described in particular in documents U.S. Pat. No. 5,223,004, EP 0 092 153, U.S. Pat. Nos. 3,338,030 or 5,137,548.

Purifications, or a purification device, in air separation units (ASUs) make it possible to mainly remove water and $CO_2$ from the air before entry into the cryogenic cold box.

An assembly of valves and pipework enables the transit of the air (to be purified) and of the impure nitrogen (which is used for the regeneration of the purification cylinders) and that connects the lower and upper parts of the cylinders to the various fluid circuits.

Generally, the assembly of valves and pipework is laid "flat" on the floor in front of or between the purification cylinders and the cross-sectional area of this assembly occupies a very large floor space in relation to the cross-sectional areas of the purification cylinders, a floor space factor ranging from 1.5 to 3.5 for ASUs respectively having a capacity of 1000 t/day $O_2$ to 5000 t/day $O_2$.

In small to medium capacity (<1000 t/day $O_2$) air separation units, this assembly may be mounted on a metal frame, except for the purification cylinders and the coupling pipework, in order to limit the work on site. The metal frame comprising the various elements supported thereby is generally referred to as a "skid".

FIG. 1 represents a purification device. Typically, a purification device comprises a first adsorber 1, a second adsorber 2, an assembly of valves and pipework 3 laid on the floor or on a skid. This purification device is connected to an air compressor 4, a regeneration heater 5, an exchanger cold box 6.

The layout of the pipework is complex especially due to the difference in levels of the interfaces of the assembly of valves and pipework with the other piece of equipment (adsorbers, exchangers, etc.) and these were large amount of pipes and bends.

Indeed, the distances CC1; DD1; EF; F1G1 are proportional to the height of the cylinders and of the exchangers relative to the assembly of valves and pipework which is itself on the floor. By way of example, for a device treating an air flow rate of around 300,000 $Nm^3/h$, these distances represent respectively 18 m for CC1 and F1G1, 19 m for DD1 and 21 m for EF for a pipework diameter of 40 inches, i.e. 1 m.

This arrangement leads to a large amount of pipes and bends linked to this layout which consequently leads to pressure drops in the process. 0.5 mbar per m of additional pipework and 2.5 mbar per additional bend can be considered.

Starting from here, one problem that is faced is that of providing a purification device that has a smaller amount of pipework.

SUMMARY

One solution to the present invention is a gas purification device comprising two adsorbers 1 and 2, a gas compressor 4, a heater 5, a set of exchangers 6, a first assembly of pipework and valves 10 and a second assembly of pipework and valves 11, characterized in that the first assembly of pipework and valves 10 is laid on the floor or on a metal structure and the second assembly of pipework and valves 11 is located high up along the same vertical axis as the first assembly of pipework and valves 10.

The expression "located high up" is understood to mean that the center of gravity of the second assembly of pipework and valves is located approximately (i.e. to within plus or minus 15%) in the same horizontal axis as the product gas outlet point of at least one adsorber.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Depending on the case, the location device according to the invention may have one or other of the following characteristics:

the second assembly of pipework and valves 11 is supported with the aid of a set of supports resting at least partially on the first assembly of pipework and valves 10;

the set of supports is a metal structure;

the second assembly of pipework and valves 11 is supported directly by the first assembly of pipework and valves 10;

the first and second assemblies of pipework and valves 10 and 11 rest on a metal frame enabling the handling thereof;

the second assembly of pipework and valves 11 is supported with the aid of a set of supports resting at least partially on one of the two adsorbers;

in each pipework-valve assembly, the diameter of the pipework is less than 1200 mm, preferably less than 1000 mm, more preferentially still less than 800 mm;

the heater 5 is supported by the second assembly of pipework and valves 11;

the valves of the first and second assemblies of pipework and valves 10 and 11 are positioned on the facade or on the roof;

the first and second assemblies of pipework and valves 10 and 11 comprise one or more pieces of equipment chosen from check valves, measurement instruments, and pressure regulators, with said pieces of equipment positioned on the facade or on the roof;

the set of exchangers 6 is a cold box of cryogenic exchangers.

For the piece of equipment positioned "on the facade" (check valves, valves, measurement instruments, pressure regulators, etc.), it is understood that the pieces of equipment are positioned facing the user so that he/she can easily gain access thereto. For the piece of equipment positioned "on the roof", it is understood that the pieces of equipment are positioned facing upwards so that they can be accessible with a lifting appliance (crane, lift truck, etc.).

Figure 1:
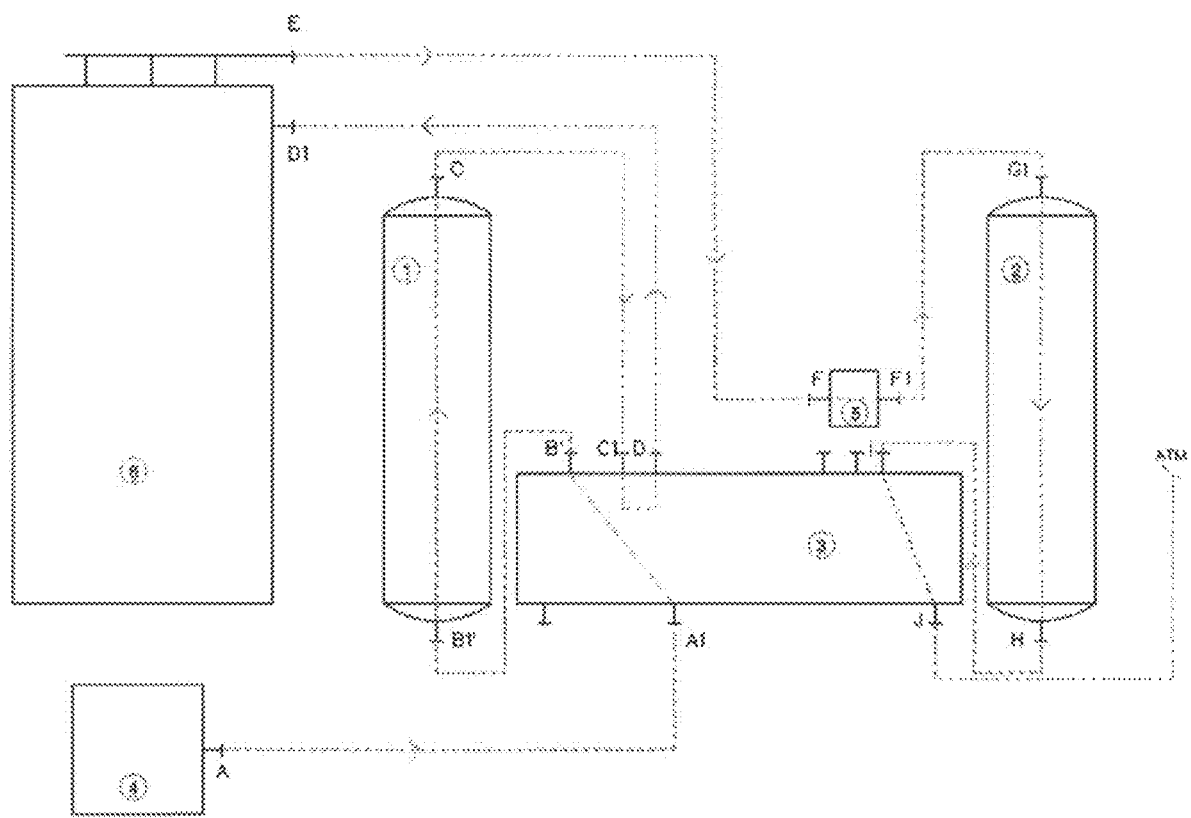
FIG. 1 illustrates a schematic representation as known to the prior art.

The objective of the present invention is to divide the assembly of valves and pipework into two sub-assemblies of reduced size that are installed one above the other and that thus reduce the distances CC1; DD1; EF; F1G1 when referring to FIG. 1.

Figure 2:
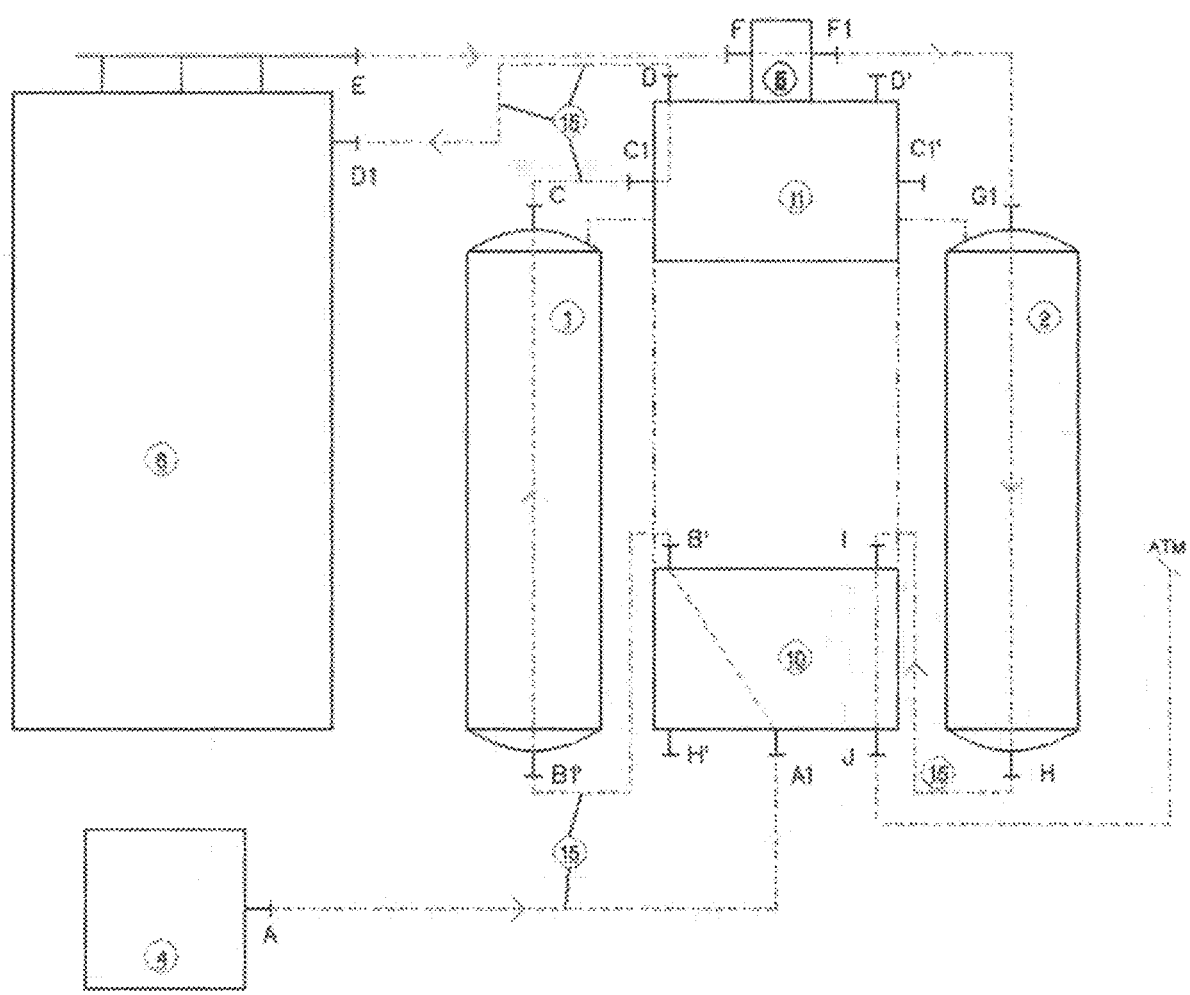
FIG. 2 illustrates a schematic representation in accordance with another embodiment of the present invention.

The present invention will now be described in greater detail with the aid of FIG. 2.

The purification device comprises two adsorbers 1 and 2, two superimposed sub-assemblies of valves and pipework 10 and 11, where 10 is laid on the floor, and 11 supported by means of a set of supports resting on 10. This purification device is connected to a gas compressor 4, a regeneration heater 5, a set of exchangers 6.

Pipework 15 external to the pipework-valve sub-assemblies 10 and 11 may be attached to the device and optionally be supported by one or more elements of the device. The assembly of this external pipework 15 will in general be carried out on the construction site.

The device according to the invention enables the reduction in the installation cost of the purification device by reducing the overall amount of length of pipework.

By way of example, for a system treating an air flow rate of 300,000 Nm$^3$/h, the reduction in length of pipework is of the order of 40% and the reduction in the amount of welds is of the order of 15%.

Moreover, dividing the assembly of valves and pipework 3 into two makes it possible, for the same capacity, to reduce the size of the 2 sub-assemblies of valves and pipework 10 and 11 and to thus envisage the prefabrication thereof on a skid with the advantage of limiting the constraints linked to the transport size.

Furthermore, the device according to the invention makes it possible to significantly reduce the installation times by limiting the construction activities on site to only the connections of the pipework 15 owing to its high degree of prefabrication on a skid.

Figure 3:
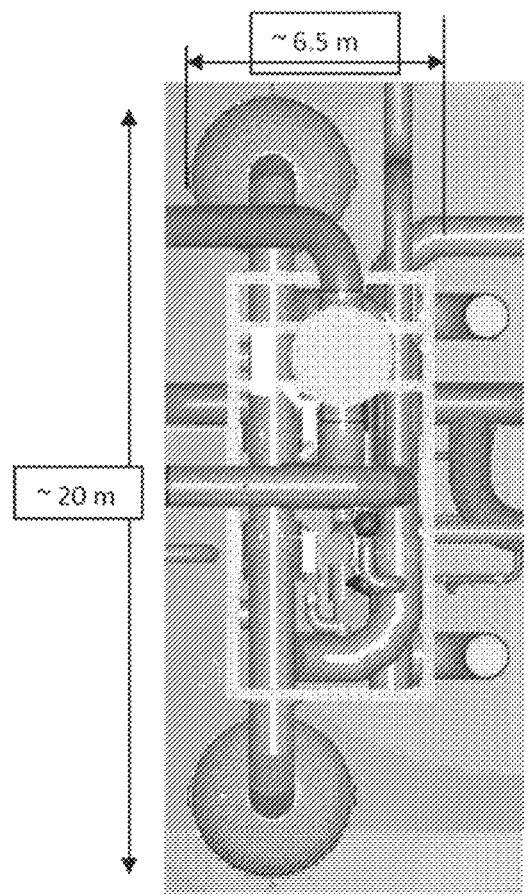
FIG. 3 illustrates a schematic representation in accordance with another embodiment of the present invention
Figure 4:
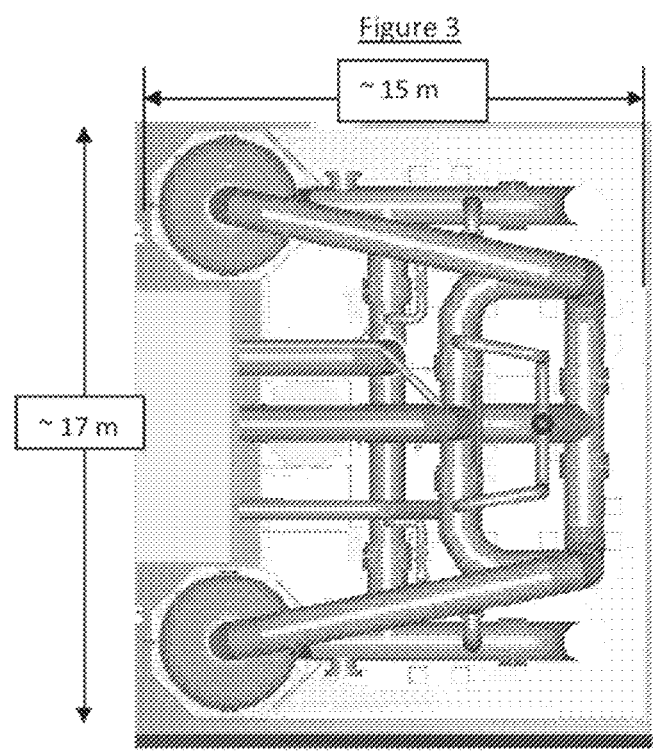
FIG. 4 illustrates a schematic representation as known to the prior art.

Finally, as can be seen in FIG. 3, the device according to the invention occupies a smaller floor space than that which an identical device of conventional design laid on the floor would occupy, FIG. 4.

By way of example, for a system treating an air flow rate of 300,000 Nm$^3$/h, the floor area and the civil engineering slab for installing all the pieces of equipment of the purification device is reduced by the order of 51%. The floor space factor of the two sub-assemblies of valves and pipework in relation to the sizes of these purification cylinders is 1.85.

Finally, another subject of the present invention is the use of a purification device according to the invention for producing oxygen from an air flow. In this case, the adsorbers of the purification device will have the main role of removing water and $CO_2$ from the air flow before entry into the cold box of cryogenic exchangers.

Another subject of the invention is the use of the purification device according to the invention for producing carbon monoxide from synthesis gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A gas purification device comprising:
   two adsorbers, each comprising a lower portion and an upper portion,
   a gas compressor,
   a heater,
   a set of exchangers,
   a first assembly of pipework and valves, and
   a second assembly of pipework and valves,
   wherein the first assembly of pipework and valves is located on the floor or on a metal structure proximate to the lower portion, and the second assembly of pipework and valves is located high up along the same vertical axis as the first assembly of pipework and valves proximate to the upper portion,
   wherein the second assembly of pipework and valves is supported at least partially by a set of supports resting at least partially on the first assembly of pipework and valves.

2. The device as claimed in claim 1, wherein the set of supports is a metal structure.

3. The device as claimed in claim 1, wherein the second assembly of pipework and valves is supported with the aid of a set of supports resting at least partially on one of the two adsorbers.

4. The device as claimed in claim 1, wherein, in each pipework-valve assembly, the diameter of the pipework is less than 1200 mm.

5. The device as claimed in claim 1, wherein the valves of the first and second assemblies of pipework and valves and are positioned on a facade or on a roof.

6. The device as claimed in claim 1, wherein the first and second assemblies of pipework and valves and comprise one or more pieces of equipment selected from the group consisting of check valves, measurement instruments, and pressure regulators, with said pieces of equipment positioned on a facade or on a roof.

7. The device as claimed in claim 1, wherein the set of exchangers is a cold box of cryogenic exchangers.

8. A gas purification device comprising:
   two adsorbers, each comprising a lower portion and an upper portion,
   a gas compressor,
   a heater,
   a set of exchangers,
   a first assembly of pipework and valves, and
   a second assembly of pipework and valves,
   wherein the first assembly of pipework and valves is located on the floor or on a metal structure proximate to the lower portion, and the second assembly of pipework and valves is located high up along the same vertical axis as the first assembly of pipework and valves proximate to the upper portion, wherein the second assembly of pipework and valves is supported directly by the first assembly of pipework and valves.

9. The device as claimed in claim 8, wherein the second assembly of pipework and valves is supported with the aid of a set of supports resting at least partially on one of the two adsorbers.

10. The device as claimed in claim 8, wherein, in each pipework-valve assembly, the diameter of the pipework is less than 1200 mm.

11. The device as claimed in claim 8, wherein the valves of the first and second assemblies of pipework and valves and are positioned on a facade or on a roof.

12. The device as claimed in claim 8, wherein the first and second assemblies of pipework and valves and comprise one or more pieces of equipment selected from the group consisting of check valves, measurement instruments, and pressure regulators, with said pieces of equipment positioned on a facade or on a roof.

13. The device as claimed in claim 8, wherein the set of exchangers is a cold box of cryogenic exchangers.

14. A gas purification device comprising:
two adsorbers, each comprising a lower portion and an upper portion,
a gas compressor,
a heater,
a set of exchangers,
a first assembly of pipework and valves, and
a second assembly of pipework and valves,
wherein the first assembly of pipework and valves is located on the floor or on a metal structure proximate to the lower portion, and the second assembly of pipework and valves is located high up along the same vertical axis as the first assembly of pipework and valves proximate to the upper portion,
wherein the first and second assemblies of pipework and valves and rest on a metal frame enabling the handling thereof.

15. The device as claimed in claim 14, wherein the second assembly of pipework and valves is supported with the aid of a set of supports resting at least partially on one of the two adsorbers.

16. The device as claimed in claim 14, wherein, in each pipework-valve assembly, the diameter of the pipework is less than 1200 mm.

17. The device as claimed in claim 14, wherein the valves of the first and second assemblies of pipework and valves and are positioned on a facade or on a roof.

18. The device as claimed in claim 14, wherein the first and second assemblies of pipework and valves and comprise one or more pieces of equipment selected from the group consisting of check valves, measurement instruments, and pressure regulators, with said pieces of equipment positioned on a facade or on a roof.

19. The device as claimed in claim 14, wherein the set of exchangers is a cold box of cryogenic exchangers.

* * * * *